United States Patent
Jung

(10) Patent No.: US 8,970,635 B2
(45) Date of Patent: Mar. 3, 2015

(54) LIQUID CRYSTAL DISPLAY WITH BRIGHTNESS EXTRACTOR AND DRIVING METHOD THEREOF FOR MODULATING IMAGE BRIGHTNESS BY CONTROLLING THE AVERAGE PICTURE LEVEL TO REDUCE GLARE AND EYE FATIGUE

(75) Inventor: Hoyoung Jung, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 876 days.

(21) Appl. No.: 12/292,688

(22) Filed: Nov. 24, 2008

(65) Prior Publication Data

US 2010/0039451 A1 Feb. 18, 2010

(30) Foreign Application Priority Data

Aug. 12, 2008 (KR) ........................ 10-2008-0078942

(51) Int. Cl.
*G09G 1/04* (2006.01)
*H02J 3/14* (2006.01)
*G06F 1/26* (2006.01)
*G09G 5/10* (2006.01)
(Continued)

(52) U.S. Cl.
CPC ................ *G09G 3/3611* (2013.01); *G09G 5/10* (2013.01); *G09G 2320/0276* (2013.01); *G09G 2320/0626* (2013.01); *G09G 2360/16* (2013.01); *H04N 5/57* (2013.01); *H04N 9/69* (2013.01); *H04N 21/4318* (2013.01); *H04N 21/44008* (2013.01)
USPC .............. 345/690; 345/12; 345/63; 345/77; 345/84; 345/90; 345/102; 700/295; 700/296; 700/297; 700/298

(58) Field of Classification Search
CPC .................................................... G09G 5/10
See application file for complete search history.

(56) References Cited

U.S. PATENT DOCUMENTS 6,067,645 A * 5/2000 Yamamoto et al. ............. 714/57
6,654,028 B1 11/2003 Yamakawa
(Continued)

FOREIGN PATENT DOCUMENTS

| JP | 11-327496 | 11/1999 |
|---|---|---|
| JP | 2000-276091 | 10/2000 |

(Continued)

OTHER PUBLICATIONS

Japanese Office Action dated Sep. 26, 2011 for corresponding Japanese patent application No. 2008-297754.

*Primary Examiner* — Joseph Feild
*Assistant Examiner* — K. Kiyabu
(74) *Attorney, Agent, or Firm* — Morgan, Lewis & Bockius LLP

(57) ABSTRACT

The present disclosure is related to the liquid crystal display device and the driving method for selectively controlling the average picture level. The liquid crystal display device of the present disclosure comprises: a brightness extractor separating a brightness and a color difference information from an input image; an user interface receiving a limit APL; an APL restrictor calculating an average APL of the input image based on the brightness from the brightness extractor, modulating the brightness of the input image such that the average APL is restricted lower than the limit APL when the average APL of input image is higher than the limit APL, and converting the modulated brightness and the color difference information into a RGB data; and a driving circuit representing the RGB data from the APL restrictor on a liquid crystal display panel.

7 Claims, 10 Drawing Sheets

(51) Int. Cl.
*G09G 3/36* (2006.01)
*H04N 5/57* (2006.01)
*H04N 9/69* (2006.01)
*H04N 21/431* (2011.01)
*H04N 21/44* (2011.01)

(56) References Cited

U.S. PATENT DOCUMENTS

| | | | |
|---|---|---|---|
| 2001/0002125 A1* | 5/2001 | Dagman | 345/153 |
| 2001/0035850 A1 | 11/2001 | Okamoto et al. | |
| 2002/0130830 A1* | 9/2002 | Park | 345/99 |
| 2004/0125068 A1* | 7/2004 | Lee | 345/99 |
| 2004/0155875 A1 | 8/2004 | Abe et al. | |
| 2005/0104842 A1* | 5/2005 | Baik | 345/102 |
| 2005/0140631 A1 | 6/2005 | Oh et al. | |
| 2005/0140640 A1* | 6/2005 | Oh et al. | 345/102 |
| 2005/0162343 A1* | 7/2005 | Kim | 345/58 |
| 2005/0212825 A1* | 9/2005 | Lee et al. | 345/690 |
| 2005/0253825 A1* | 11/2005 | Kawamura et al. | 345/204 |
| 2005/0264702 A1* | 12/2005 | Yoshii | 348/687 |
| 2006/0221046 A1 | 10/2006 | Sato et al. | 345/102 |
| 2006/0284805 A1* | 12/2006 | Baek | 345/88 |
| 2007/0126727 A1* | 6/2007 | Chiang | 345/207 |
| 2007/0182670 A1* | 8/2007 | Watanabe et al. | 345/75.2 |
| 2010/0060672 A1* | 3/2010 | Hoppenbrouwers et al. | 345/690 |

FOREIGN PATENT DOCUMENTS

| | | |
|---|---|---|
| JP | 2001-296831 | 10/2001 |
| JP | 2001-296855 | 10/2001 |
| JP | 2002-333858 | 11/2002 |
| JP | 2004-134853 | 4/2004 |
| JP | 2005-196196 | 7/2005 |
| JP | 2005-208314 | 8/2005 |

* cited by examiner

LCD

PDP or CRT

LIQUID CRYSTAL DISPLAY WITH BRIGHTNESS EXTRACTOR AND DRIVING METHOD THEREOF FOR MODULATING IMAGE BRIGHTNESS BY CONTROLLING THE AVERAGE PICTURE LEVEL TO REDUCE GLARE AND EYE FATIGUE

This application claims the benefit of Korea Patent Application No. 10-2008-0078942, filed on Aug. 12, 2008, which is incorporated herein by reference for all purposes as if fully set forth herein.

BACKGROUND OF THE INVENTION

1. Field of the Invention

The present disclosure is related to the liquid crystal display device and the driving method for selectively controlling the average picture level (or "APL").

2. Discussion of the Related Art

Nowadays, in the display device market, for replacing cathode ray tube (or "CRT") having heavy and large volume, various flat panels are developed. For these flat panel display device, there are liquid crystal display (or "LCD") device, field emission display (or "FED"), plasma display panel (or "PDP"), electroluminescence device (or "EL") and so on.

Thanks to the light weight, the thin thickness, the low power consumption, and the low power driving, the liquid crystal display device is progressively applied to various applications. For example, the liquid crystal display device is applied to the portable computer such as notebook PC, the office automation devices, the audio/video devices, the advertizing devices. The liquid crystal display device represents the video images by controlling the electric field supplied to the liquid crystal layer to modulate the light entering from the backlight unit.

As shown in the FIG. 1, as the LCD device has the driving characteristics in which the video image is represented with maximum brightness always regardless of the condition of the image contents, the peak brightness is almost equal to the full white brightness. The peak brightness is the brightness detected at the central portion of the LCD panel when the LCD panel is driven such that the back ground image of the LCD is represented with the black gray-scale and the central portion surrounded by the back ground is represented with the maximum brightness. The full white brightness is the brightness detected from the screen when the overall screen of the LCD panel is represented with the maximum brightness.

If the peak brightness is closely equal to the full white brightness, it is advantage for the computer monitor in which the exact brightness and color representation are important. However, for the television monitor of which video images are changed dynamically, this monitor may make a bad effect to the observer's eyes. Especially, when a person watches a snowy background of which most peak brightness is the white gray-scale, due to excessive high brightness, eye glare is getting severely and then eye fatigue will be accumulated.

On the contrarily, for the PDP or CRT, the full white brightness is generally lower than the peak brightness. Therefore, when watching high brightness image contents of the PDP or CRT, the brightness of each pixel will be naturally down so that the eye glare phenomenon is not occurred and the eye fatigue is lowered.

As a result, required are the method for reducing eye glare and eye fatigue when an LCD device shows a high brightness image contents.

SUMMARY OF THE INVENTION

The purpose of the present disclosure, for solve the disadvantages and problems according to the related art, is to provide the liquid crystal display device and driving method of the LCD device for reducing the eye glare and eye fatigue.

To achieve the above purposes and advantages, the liquid crystal display device according to one embodiment of the present disclosure comprises: a brightness extractor separating a brightness and a color difference information from an input image; an user interface receiving a limit APL; an APL restrictor calculating an average APL of the input image based on the brightness from the brightness extractor, modulating the brightness of the input image such that the average APL is restricted lower than the limit APL when the average APL of input image is higher than the limit APL, and converting the modulated brightness and the color difference information into a RGB data; and a driving circuit representing the RGB data from the APL restrictor on a liquid crystal display panel.

The liquid crystal display device according to another embodiment of the present disclosure comprises: a brightness extractor separating a brightness and a color difference information from an input image; an APL restrictor calculating an average APL of the input image based on the brightness from the brightness extractor, modulating the brightness of the input image by lowering with a predetermined modulating width when the average APL of input image is higher than the limit APL, and converting the modulated brightness and the color difference information into a RGB data; and a driving circuit representing the RGB data from the APL restrictor on a liquid crystal display panel.

The driving circuit comprises a gate drive IC, a source drive IC and a timing controller of a control board which are explained in following embodiments in detail.

The method for driving a liquid crystal display device according to one embodiment of the present disclosure comprises steps of: separating a brightness and a color difference information from an input image; receiving a limit APL through an user interface; calculating an average APL of the input image based on the brightness; modulating the brightness of the input image such that the average APL is lower than the limit APL when the average APL of input image is higher than the limit APL; converting the modulated brightness and the color difference information into a RGB data; and representing the RGB data from the APL restrictor on a liquid crystal display panel.

The method for driving a liquid crystal display device according to another embodiment of the present disclosure comprises steps of: separating a brightness and a color difference information from an input image; calculating an average APL of the input image based on the brightness; modulating the brightness of the input image to lower the average APL with a predetermined modulating width when the average APL of input image is higher than a reference APL; converting the modulated brightness and the color difference information into a RGB data; and representing the RGB data from the APL restrictor on a liquid crystal display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
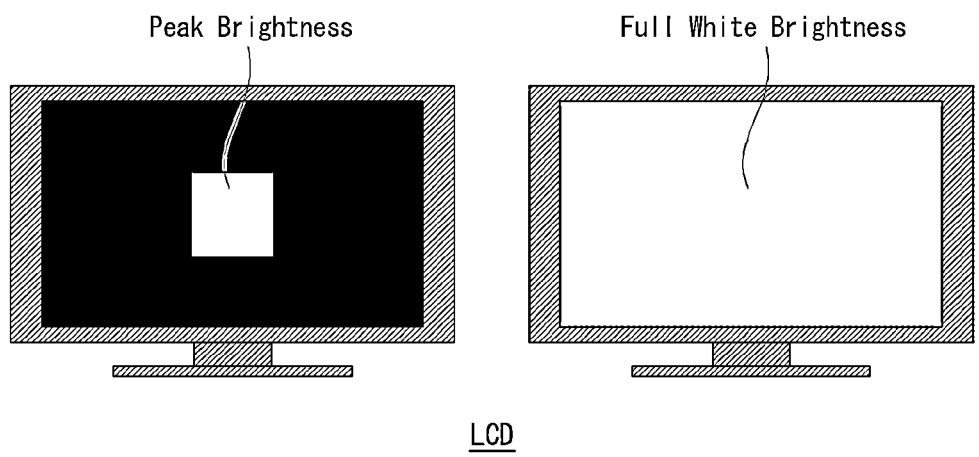
FIG. 1 is a brief drawing illustrating the peak brightness and the full white brightness in LCD, PDP and CRT, respectively.
Figure 1:
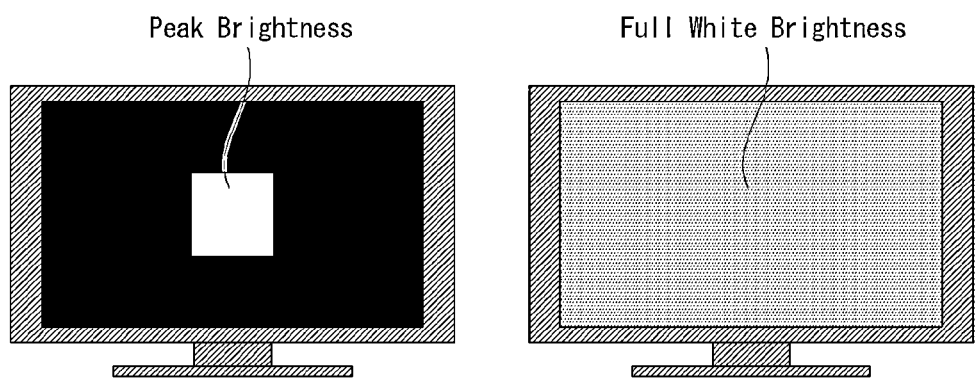

Advantages and features of the present disclosure and a method of achieving the advantages and the features will be apparent by referring to embodiments described below in detail in connection with the accompanying drawings. Like reference numerals designate like elements throughout the detailed description.

Referring to FIGS. 2 to 10, the preferred embodiments according to the present disclosure will be explained.

Figure 2:
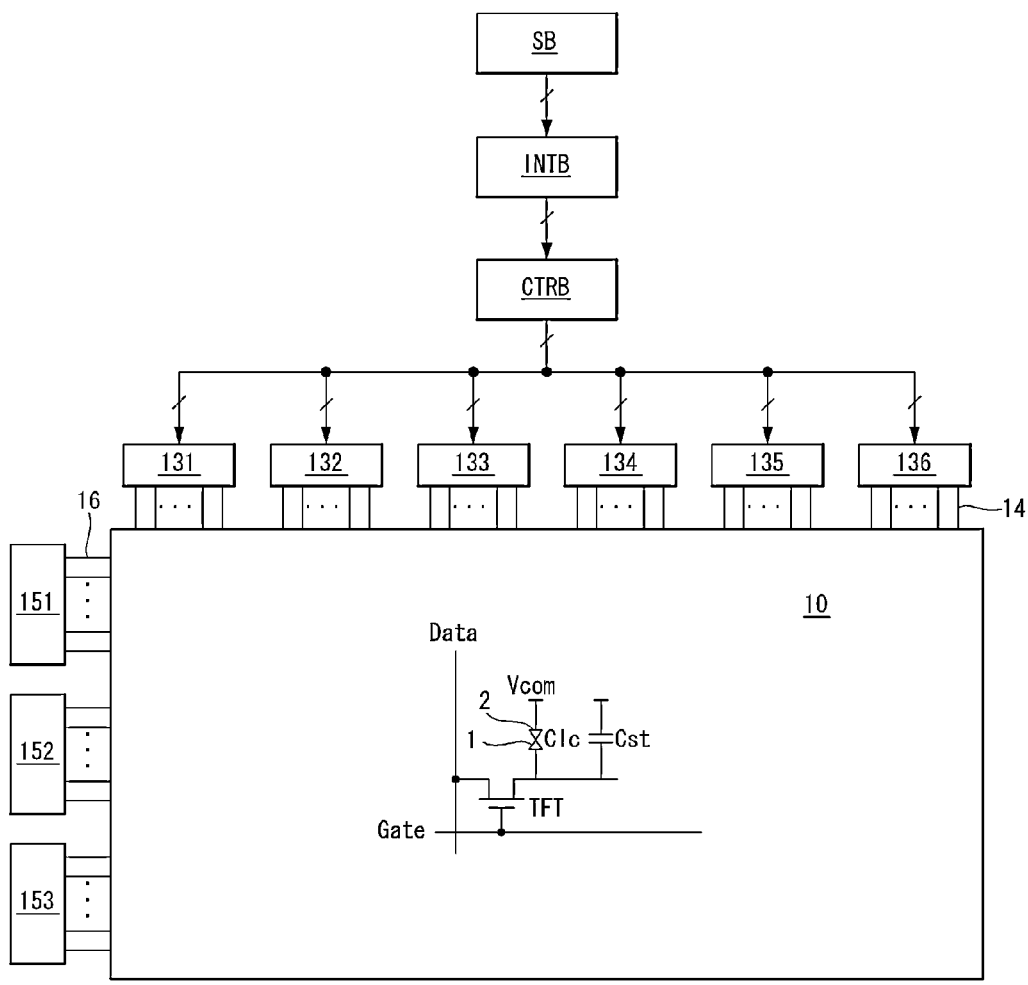
FIG. 2 is a block diagram illustrating the liquid crystal display device according to one embodiment of the present disclosure.

Referring to FIG. 2, the liquid crystal display device according to the embodiment of the present disclosure comprises a liquid crystal display panel 10, a plurality of gate drive ICs (or "integrated circuits") 151 to 153, a plurality of source drive ICs 131 to 136, a system board (SB), an interface board (INTB), and a control board (CTRB). In the FIG. 2, a back light unit and a driving circuit of the backlight are not shown.

The liquid crystal display panel 10 includes two glass substrates joining each other and a liquid crystal layer therebetween. The liquid crystal cells of the LCD panel 10 are arrayed in matrix pattern by the crossed structure of the data lines 14 and the gate lines 16.

On the lower glass substrate of the liquid crystal display panel 10, data lines 14, gate lines 16, TFTs, liquid crystal cells (Clc) connected to the TFTs and driven by the electric field between the pixel electrodes 1 and the common electrode 2, and storage capacitors (Cst). On the upper glass substrate of the liquid crystal display panel 10, a black matrix, a color filter and a common electrode 2 are formed. The common electrode 2 is formed on the upper glass substrate for the vertical electric field driving type such as TN mode (Twisted Nematic mode) and VA mode (Vertical Alignment mode). On the contrary, for the horizontal electric field driving type such as IPS mode (In-Plane Switching mode) and FFS mode (Fringe Field Switching mode), the common electrode 2 is formed on the lower glass substrate with the pixel electrode 1. On the outer surfaces of the upper and lower glass substrates of the liquid crystal display panel 10, polarization plates are attached. On the inner surface of the upper and lower glass substrate of the liquid crystal display panel 10, alignment layers for pre-tilt angle of the liquid crystal material are formed.

The source drive ICs 131 to 136 receive the digital video data transmitted in mini LVDS method from the control board (CTRB), converts the digital video data into analog data voltages in response to the data timing control signal from the control board (CTRB), and then supplies them to the data lines 14 of the liquid crystal display panel 10. Each of the source drive IC is equipped with a mini LVDS receiving circuit for receiving and demodulating the mini LVDS data.

Each of the gate drive IC 151 to 153 generate the gate pulse in response to the gate timing control signal from the control board (CTRB) and sequentially supplies the gate pulse to the gate lines 16.

In the first embodiment of the present disclosure, the system board (SB) converts the resolution of the digital video data to be proper to the resolution of the liquid crystal display panel 10. The system board (SB) modulates each pixel brightness of the input images such that the average APL of the image currently inputted is restricted under the limit average picture level received through the user interface. The user interface includes a user input device such as On-Screen-Display, remote controller, touch panel, key board, and mouse, and a decoder for decoding the data from the input device. Further, the system board (SB) sends the digital video data and the timing signals with the LVDS clock to the interface board (INTB) using the LVDS interfacing method. The timing signals include Vsynch signal, Hsynch signal, the data enable signal and Dot clock.

In the second embodiment of the present disclosure, the system board (SB) changes the resolution of the digital video data to be proper to the resolution of the LCD panel, using a scaler. The system board (SB) compares the average picture lever of the input frame image with a predetermined reference APL. If the average APL of the frame image currently inputted is higher than the reference APL, the system board (SB) modulates the pixel brightness of the frame image to actively lower the average APL. Here, the adjusting width of the average APL can be varied according to the average APL of the frame image currently inputted.

The interface board (INTB) receives the digital video data, the timing signals and the LVDS clocks from the system board (SB) through the LVDS interface receiving circuit. The interface board (INTB) transmits these signals to the control board (CTRB) through the LVDS interface transmitting circuit.

The control board (CTRB) receives the digital video data, the timing signals and LVDS clocks from the interface board (INTB) through the LVDS interface receiving circuit. The timing controller equipped into the control board (CTRB) converts the received digital video data into the mini LVDS data, and sends the mini LVDS data with the mini LVDS clock to the source drive ICs 131 to 136. Further, the control board (CTRB) generates the data timing control signal for controlling the operating timing of the source drive ICs 131 to 136 and the gate timing control signal for controlling the operating timing of the gate drive ICs 151 to 153.

Figure 3:
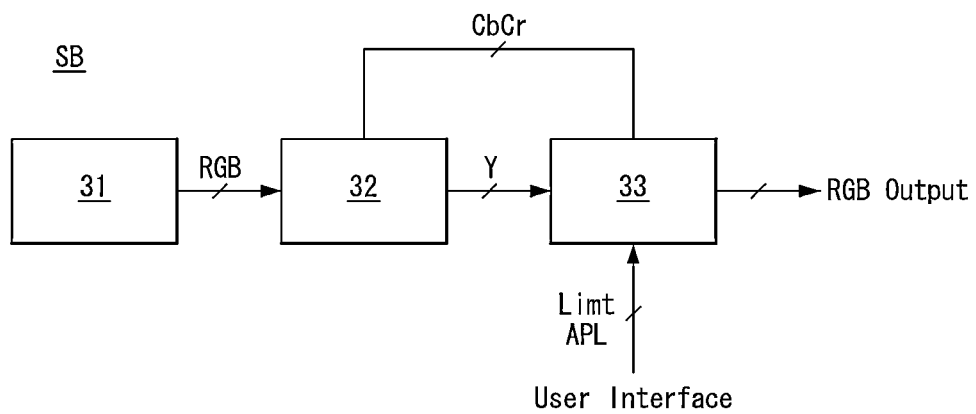
FIG. 3 is a block diagram illustrating circuit configuration of the system board according to the first embodiment of the present disclosure.

FIG. 3 illustrates the system board according to the first embodiment of the present disclosure, in detail.

Referring to FIG. 3, the system board (SB) includes a scaler 31, a brightness extractor 32, and an APL restrictor 33.

The scaler 31 adjusts the resolution of the image signal received from external devices or TV tuners to the resolution of the LCD panel 10.

The brightness extractor 32 extracts the brightness value (Y) and the color difference information (CbCr) from the RGB digital video data, and supplies them to the APL restrictor 33.

The APL restrictor 33 calculates the average APL of one frame image inputted from the brightness extractor 32, and modulates each brightness (Y) lower than limit APL inputted from the user interface. Further, the APL restrictor 33 converts the modulated brightness (Y) and the color difference information (CbCr) from the brightness extractor 32 into the digital video data, reversely. The RGB digital video data outputted from the APL restrictor 33 is supplied to the timing controller of the control board (CTRB) via the interface board (INTB).

Figure 4:
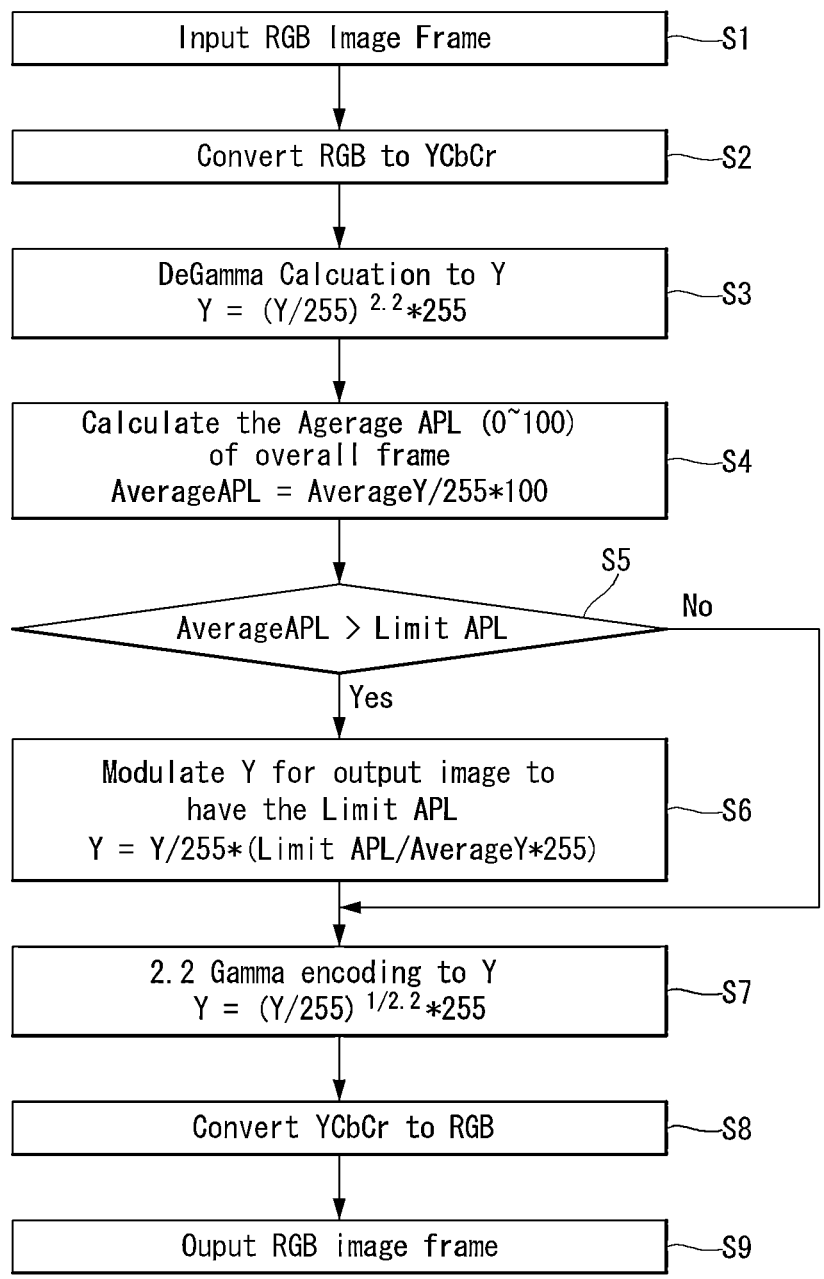
FIG. 4 is a flow diagram illustrating the video data processing steps of the brightness extractor and the APL restrictor shown in FIG. 3, step by step.

FIG. 4 is a flow chart illustrating the image data processing steps of the brightness extractor 32 and the APL restrictor 33 according to the first embodiment of the present disclosure, step by step.

Referring to FIG. 4, the brightness extractor 32 calculates each brightness (Y) and each color difference information (CbCr) of each RGB digital video data using the Equations (1) to (3) accepting the input RGB digital video data as variations (steps S1 and S2).

$$Y=0.299R+0.589G+0.114B \tag{1}$$

$$Cb=0.564(B-Y) \tag{2}$$

Here, $B-Y=B-(0.3R+0.59G+0.11B)=-0.3R-0.59G+0.89B$ $$Cr=0.713(R-Y) \tag{3}$$

Here, $R-Y=R-(0.3R+0.59G+0.11B)=0.7R-0.59G-0.11B$

Figure 5:
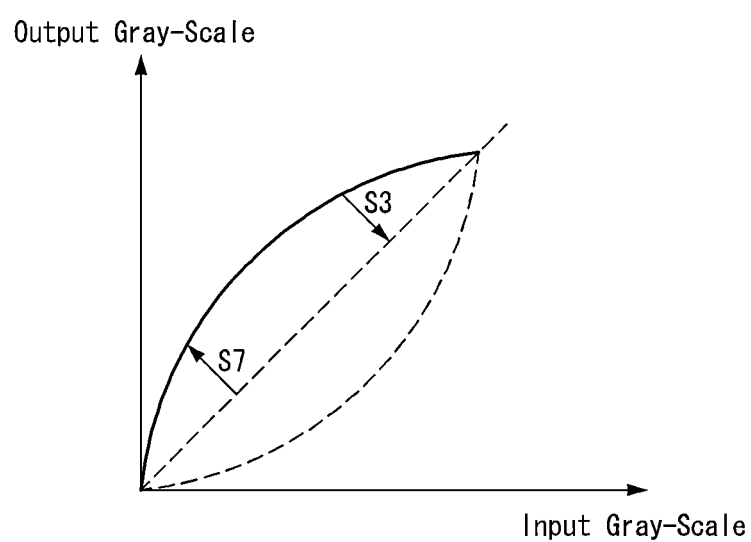
FIG. 5 is the graph illustrating the gamma calculation in S3 step and S7 step of FIG. 4.

For linearizing the brightness of the input image having non-linear gamma characteristics as shown in FIG. 5, the APL restrictor 33 performs the degamma calculation for each brightness (Y) of one frame image, as shown in Equation (4) (Step S3).

$$Y = \left(\frac{Y}{255}\right)^{2.2} \times 255 \tag{4}$$

The APL restrictor 33 calculates the average picture level of overall of one frame using Equation (5) accepting the brightness calculated by degamma as the variations (step S4). The APL may have one value of 0~100. As the average APL value is higher, the relevant frame image is getting brighter. On the contrary, as the average APL value is lower, the relevant frame image is getting darker.

$$AverageAPL = \frac{AverageY}{255} \times 100 \tag{5}$$

Here, the average Y, as the average brightness of one frame image calculated by degamma, is gotten by dividing the total summation of brightnesses (Y) of one frame image by the number of pixels of LCD panel 10.

The APL restrictor 33 compares the limit APL inputted through the user interface with the average APL of one frame image. If the average APL of the one frame image currently inputted is higher than the limit APL (step S5), the APL restrictor 33 modulates each brightness (Y) of the pixels as shown in Equation (6) so that the average APL of the image shown on the LCD panel 10 is not over the limit APL (step S6). If the APL of one frame image currently inputted is lower than the limit APL (step S5), then the APL restrictor 33 does not modulate the pixel brightness of one frame image currently inputted but performs the step S7 to convert the gamma characteristics of inputted image into original status.

$$Y = \frac{Y}{255} \times \left(\frac{Limit\, APL}{AverageY \times 255}\right) \tag{6}$$

The APL restrictor 33 substitutes the unmodulated original brightness (Y) or the modulated brightness (Y) in step S6 into Equation (7) which is the 2.2 gamma encoding calculating equation to reversely convert the linearized gamma characteristics into the original gamma characteristics (step S7).

$$Y = \left(\frac{Y}{255}\right)^{\frac{1}{2.2}} \times 255 \tag{7}$$

The APL restrictor 33 calculates the RGB digital video data which will be shown on the LCD panel 10 by substituting the color difference information (CbCr) inputted from the brightness extractor 32 and the brightness (Y) converted by the 2.2 gamma characteristics in step S7 into the following Equations (8) to (10) which are the RGB reversing equation (steps S8 and S9). The RGB digital video data outputted from the APL restrictor 33 is supplied to the source drive ICs 131 to 136 through the timing controller of the control board (CTRB).

$$R=Y+1.402Cr \tag{8}$$

$$G=Y-0.334Cb-0.713Cr \tag{9}$$

$$B=Y+1.772Cb \tag{10}$$

In the interim, the RGB to YCbCr conversion of step S2 and the YCbCr to RGB conversion of step S8 in the image data processing shown in FIG. 4 can be shared with the image engine performing other image processings. For example, the patent applications such as KR 10-2003-0099334, KR 10-2004-0030334, KR 10-2003-0041127, KR 10-2004-0078112, KR 10-2003-0099330, KR 10-2004-0115740, KR 10-2004-0049637, KR 10-2003-0040127, KR 10-2003-0081171, KR 10-2004-0030335, KR 10-2004-0049305, KR 10-2003-0081174, KR 10-2003-0081175, KR 10-2003-0081172, KR 10-2003-0080177, KR 10-2003-0081173, and KR 10-2004-0030336, extracts the brightness of the input image, analyzes the histogram based on the brightness, controls the brightness of the backlight according to the analyzing result, modulates the brightness of the input image, and then converts the brightness and the color different information into the RGB digital video data. Therefore, as the image engine which was filed prior to this disclosure includes substantially same process as the steps S2 and S8 shown in FIG. 4 can be shared with other image engines, they cannot be performed.

Figure 6:
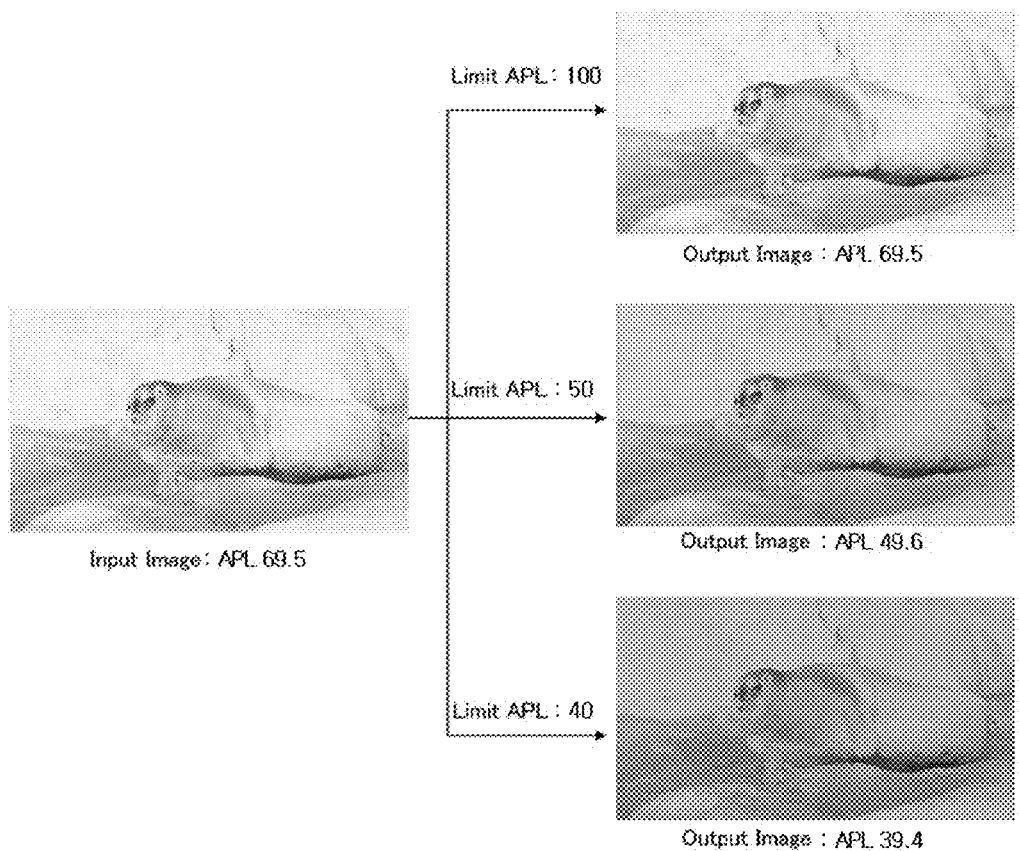
FIG. 6 is the diagram illustrating the experience result of the-first stop video image.
Figure 7:
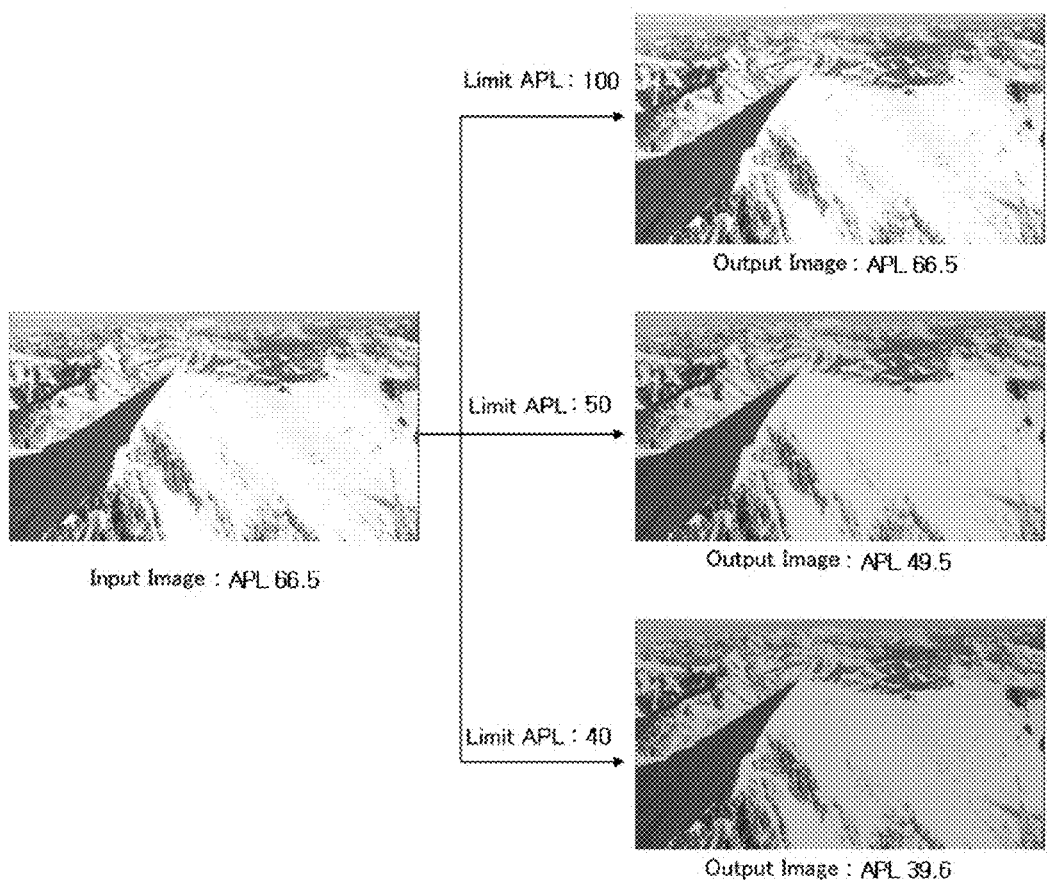
FIG. 7 is the diagram illustrating the experience result of the second stop video image.
Figure 8:
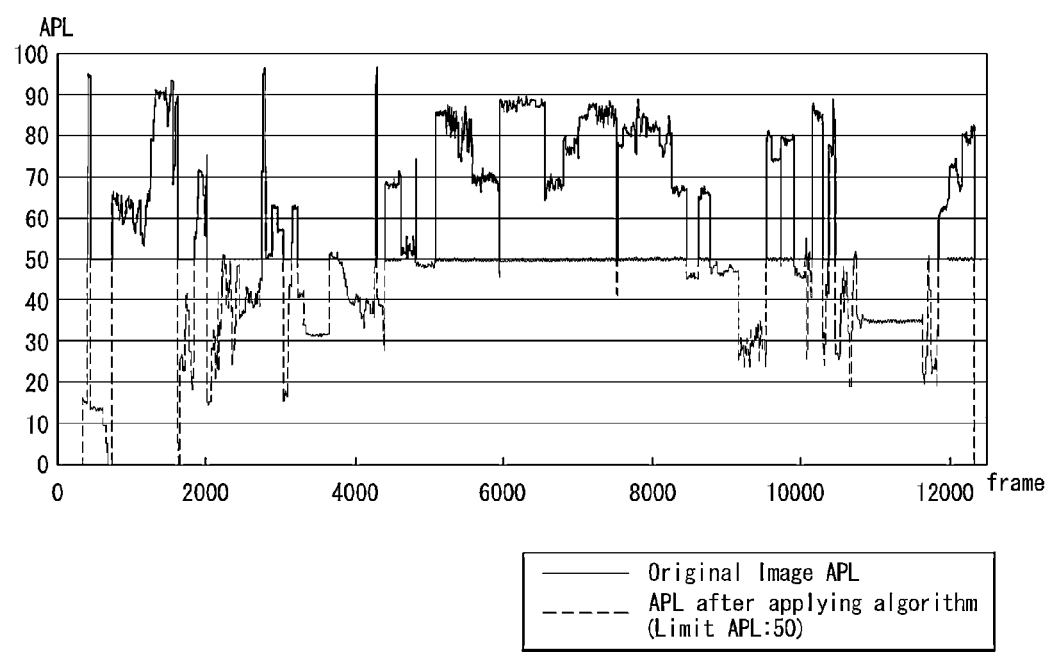
FIG. 8 is the diagram illustrating the experience result of the moving video image.

FIGS. 6 to 8 are the experience results representing the modulated data to the LCD panel 10 after modulating the data of relatively bright stop image and moving image data using the image data processing of FIG. 4.

FIG. 6 is the experiment result to the first still image of which APL is 69.5. It illustrates that the average APL of the image is changed according to the limit APL when the limit APL is controlled with 100, 50 or 40. FIG. 7 is the experiment result to the second still image of which APL is 66.5. It illustrates that the average APL of the image is changed according to the limit APL when the limit APL is controlled with 100, 50 or 40. FIG. 8 illustrates the original video image of "Snowboard Training (9 min. 41 sec.)" not modulated and the APL changes of the modulated image in which the video data is modulated with the limit APL of '50'. As shown in the experiment results, as the limit APL is getting lower, the overall brightness is also getting lower but the eye glare and fatigue are reduced.

As a result, the liquid crystal display device and the driving method according to the first embodiment of this disclosure controls the APL of the input image under the limit APL decided by the user, according to the eye glare and fatigue of the user.

Figure 9:
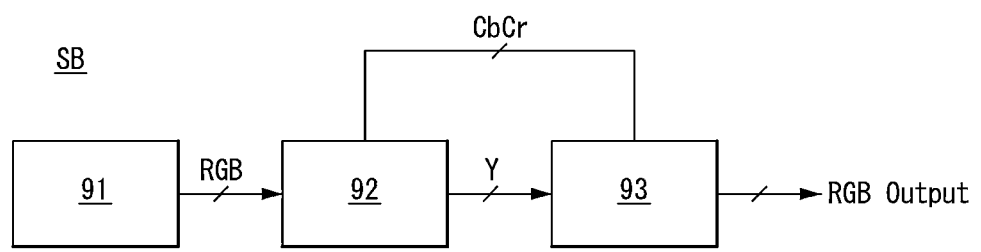
FIG. 9 is a block diagram illustrating the circuit configuration of the system board according to the second embodiment of the present disclosure.

FIG. 9 illustrates a system board (SB) according to the second embodiment of the present disclosure.

Referring to FIG. 9, the system board (SB) includes a scaler 91, a brightness extractor 92, and a APL restrictor 93.

The scaler 91 adjusts the resolution of the image signal inputted from the external appliances or TV tuner properly to the resolution of the liquid crystal display panel 10.

The brightness extractor 92 extracts the brightness (Y) and the color difference information (CbCr) of each RGB digital video data from the scaler 91 and then supplies them to the APL restrictor 93.

The APL restrictor 93 calculates the average APL of each one frame image inputted from the brightness extractor 32. Comparing the average APL with a reference APL stored in advance, the APL restrictor 93 controls down the average APL of the inputted image-by lowering the brightness (Y) of each pixel when the average APL of the inputted frame image is higher than the reference APL. Further, the APL restrictor 93 reversely converts the modulated brightness (Y) and the color difference information (CbCr) from the brightness extractor 92 into the RGB digital video data. The RGB digital video data outputted from the APL restrictor 93 is supplied to the timing controller of the control board (CTRB) via the interface board (INTB).

Figure 10:
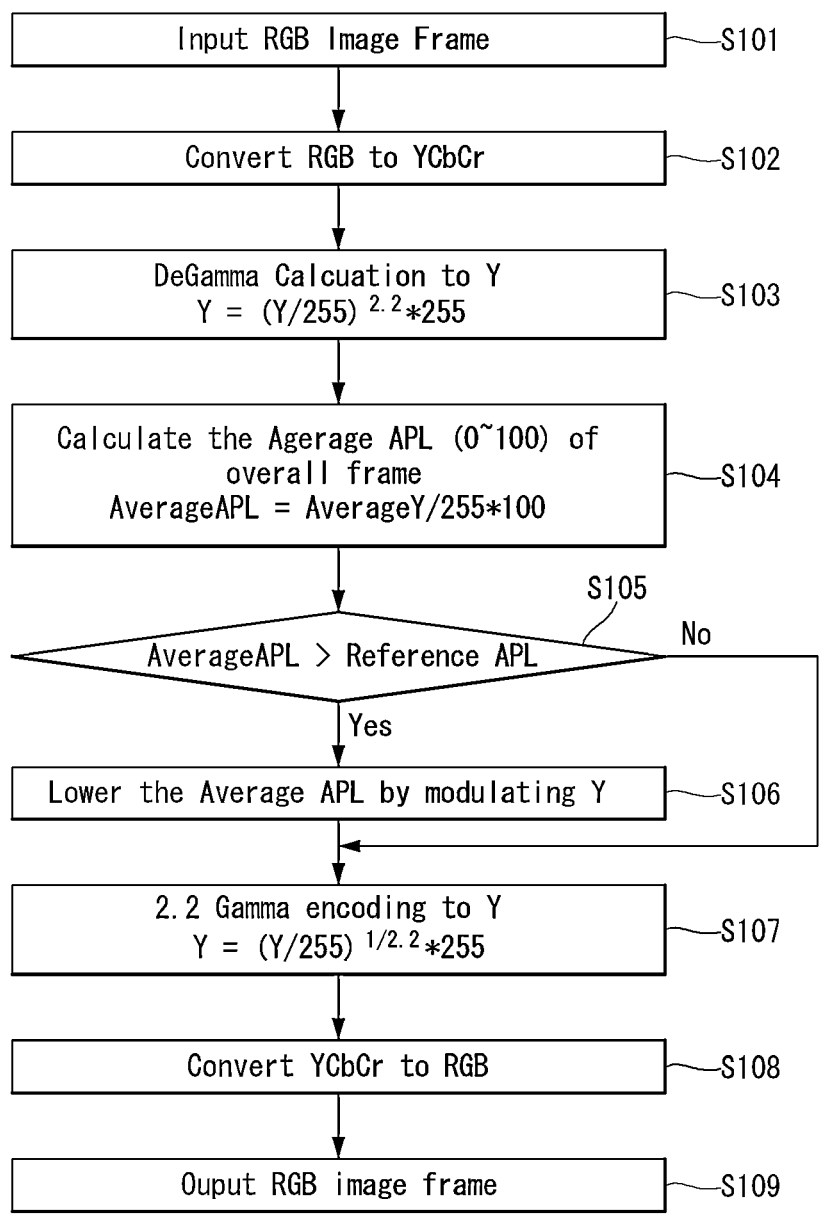
FIG. 10 is a flow chart illustrating the image data processing steps of the brightness extractor and the APL restrictor shown in FIG. 9, step by step.

FIG. 10 is a flow chart illustrating image data processing steps of the brightness extractor 92 and the APL restrictor 93 according to the second embodiment of the present disclosure, step by step.

Referring to FIG. 10, the brightness extractor 92 calculates the brightness (Y) and the color difference information (CbCr) of each RGB digital video data using the Equations 1 to 3 adapting the inputted RGB digital video data as the variations (steps S101 and 102).

The APL restrictor 93 performs the degamma calculation for each brightness (Y) of each one frame image using Equation 4 in order to linearize the brightness of the input image having non-linear gamma characteristics as shown in FIG. 5 (step S103).

The APL restrictor 93 calculates the average APL of overall one frame using Equation 5 (step S104). The APL restrictor 93 compares the average APL of inputted one frame image with a reference APL stored in advance. According to the comparing result, if the average APL of the inputted one frame image is higher than the reference APL, the APL restrictor 93 decreases the brightness of each pixel to lower the average APL of inputted one frame image. The reference APL may be decided by an experience of eye glare and fatigue. For example, it can be selected any one value between 50 and 90. The adjusting width of the average APL can be varied by the average APL of the input image. For example, as the average APL of the input image is higher, the adjusting width of the average APL can be getting larger (step S106).

When the average APL of the currently inputted one frame image is less than the reference APL (step S105), then the APL restrictor 93 does not modulate the pixel brightness of the inputted one frame image, but performs the step 107 to reversely convert the gamma characteristics of the inputted image into original condition.

The APL restrictor 93 reversely converts the linearized gamma characteristics into the original gamma characteristics by substituting the unmodulated brightness (Y) or the modulated brightness (Y) in step S106 into the Equation 7 (step S107). Further, the APL restrictor 93 calculates the RGB digital video data which will be-shown on the liquid crystal display panel 10 by substituting the color difference information (CbCr) inputted form the brightness extractor 92 and the brightness (Y) modulated to 2.2 gamma characteristics in step S107 into the Equations 8 to 10 (steps S108 and 109). The RGB digital video data outputted from the APL restrictor 93 is supplied to the source drive ICs 131 to 136 via the timing controller of the control board (CTRB).

In the interim, in the image data processing steps of FIG. 10, the steps of S102 and S108 can be use some of the image engine conducting other kinds of image processing.

As a result, the liquid crystal display device and the driving method of the LCD according to the second embodiment of the present disclosure detects the image contents which can cause eye glare and fatigue of observer, that is, the input image of which average APL is higher than the reference APL, and controls the average brightness to be lowered actively.

As mentioned above, the liquid crystal display device and the driving method of the LCD according to the embodiments of the present disclosure analyzes the APL of the input image and restricts the APL of the input image not to be larger than a predetermined limit APL value. Therefore, the brightness of the image having high brightness can be lowered so that the eye glare and fatigue are reduced.

While the embodiment of the present invention has been described in detail with reference to the drawings, it will be understood by those skilled in the art that the invention can be implemented in other specific forms without changing the technical spirit or essential features of the invention. For example, even though the embodiment of the present disclosure explains the liquid crystal display device mainly, the algorithm of these embodiments can be applied to plasma display panel (or "PDP"), electroluminescence device (or "EL") and other flat panel display devices within the scope of the present disclosure. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A liquid crystal display (LCD) device, comprising:
a scaler configured to generate an input image by adjusting a resolution of a received image signal to be a resolution of an LCD panel;
a brightness extractor configured to separate a brightness and a color difference information from the input image received from the scaler;
an average picture level (APL) restrictor configured to:
calculate an APL of the input image based on the brightness separated from the input image;
compare the APL with a limit APL;

modulate the brightness separated from the input image, such that the APL is restricted lower than the limit APL when the APL of the input image is higher than the limit APL;

convert the modulated brightness and the color difference information separated from the input image into RGB data;

an interface board configured to receive the RGB data from the APL restrictor via a first low-voltage differential signaling (LVDS) interface receiving circuit; and a driving circuit configured to:
receive the RGB data from the interface board via a second LVDS interface receiving circuit;
represent the RGB data from the interface board on the LCD panel, wherein the limit APL is decided by a selection of a user via a software input, wherein the limit APL from the user is input to the APL restrictor from the software input, and wherein the APL restrictor is further configured to, when the APL of input image is lower than the limit APL:
not modulate the brightness of the input image, and
convert the unmodulated brightness and the color difference information into the RGB data.

2. The device according to claim 1, wherein the APL restrictor is further configured to:
perform a degamma calculation to the brightness of the input image to linearize the gamma characteristics of the input image;
calculate the APL of the input image based on the linearized brightness; and
reversely convert the linearized brightness into a-non-linear gamma characteristics by performing a gamma compensation for the modulated brightness prior to converting the brightness into the RGB data.

3. The device according to claim 1, wherein the APL is restricted lower than the limit APL during all frames when the APL is higher than the limit APL.

4. A method for driving a liquid crystal display (LCD) device, the method comprising:
generating an input image by adjusting a resolution of a received image signal to be a resolution of an LCD panel;
separating a brightness and a color difference information from the input image;
by an average picture level (APL) restrictor:
receiving a limit APL through a software input user interface;
calculating an APL of the input image based on the brightness separated from the input image;
modulating the brightness of the input image, such that the APL is lower than the limit APL when the APL of the input image is higher than the limit APL; and
converting the modulated brightness and the original color difference information separated from the input image into RGB data;
transferring the RGB data from the APL restrictor via a first low-voltage differential signaling (LVDS) interface receiving circuit to an interface board;
transferring the RGB data from the interface board via a second LVDS interface receiving circuit to a driving circuit; and representing the RGB data from the interface board on the LCD panel,
wherein the APL restrictor is further configured to, when the APL of input image is lower than the limit APL:
not modulate the brightness of the input image, and
convert the unmodulated brightness and the color difference information into the RGB data.

5. The method according to claim 4, wherein:
the calculating the APL of the input image based on the brightness comprises:
linearizing a brightness gamma characteristics of the input image by performing a degamma compensation to the brightness of the input image; and
calculating the APL of the input image based on the linearized brightness and
the converting the modulated brightness and the color difference information into the RGB data comprises:
reversely converting the modulated brightness into a non-linear gamma characteristics by performing a gamma compensation, and
converting the modulated brightness reversely converted by the non-linear gamma characteristics and the color difference information into the RGB data.

6. The method according to claim 4, wherein the APL is restricted lower than the limit APL during all frames when the APL is higher than the limit APL.

7. A method for driving a liquid crystal display (LCD) device, the method comprising:
generating an input image by adjusting a resolution of a received image signal to be a resolution of an LCD panel;
separating a brightness and a color difference information from an input image;
by an average picture level (APL) restrictor:
calculating an APL of the input image based on the brightness separated from the input image;
comparing the APL with a limit APL;
modulating the brightness of the input image to lower the APL with a predetermined modulating width when the APL of the input image is higher than the reference APL; and
converting the modulated brightness and the color difference information separated from the input image into RGB data; transferring the RGB data from the APL restrictor via a first low-voltage differential signaling (LVDS) interface receiving circuit to an interface board;
transferring the RGB data from the interface board via a second LVDS interface receiving circuit to a driving circuit; and
representing the RGB data from the interface board on the LCD panel,
wherein the limit APL is decided by a selection of a user via a software input,
wherein the limit APL from the user is input to the APL restrictor, and
wherein the APL restrictor is further configured to, when the APL of input image is lower than the limit APL:
not modulate the brightness of the input image, and
convert the unmodulated brightness and the color difference information into the RGB data.

* * * * *